Sept. 23, 1952 W. R. KOCH 2,611,818

COMBINATION RADIO AND TELEVISION RECEIVING SYSTEM

Filed Dec. 1, 1949

INVENTOR
Winfield R. Koch
BY
ATTORNEY

Patented Sept. 23, 1952

2,611,818

UNITED STATES PATENT OFFICE 2,611,818

COMBINATION RADIO AND TELEVISION RECEIVING SYSTEM

Winfield R. Koch, Marlton, N. J., assignor to Radio Corporation of America, a corporation of Delaware Application December 1, 1949, Serial No. 130,507

7 Claims. (Cl. 178—5.8)

Figures 1, 2:
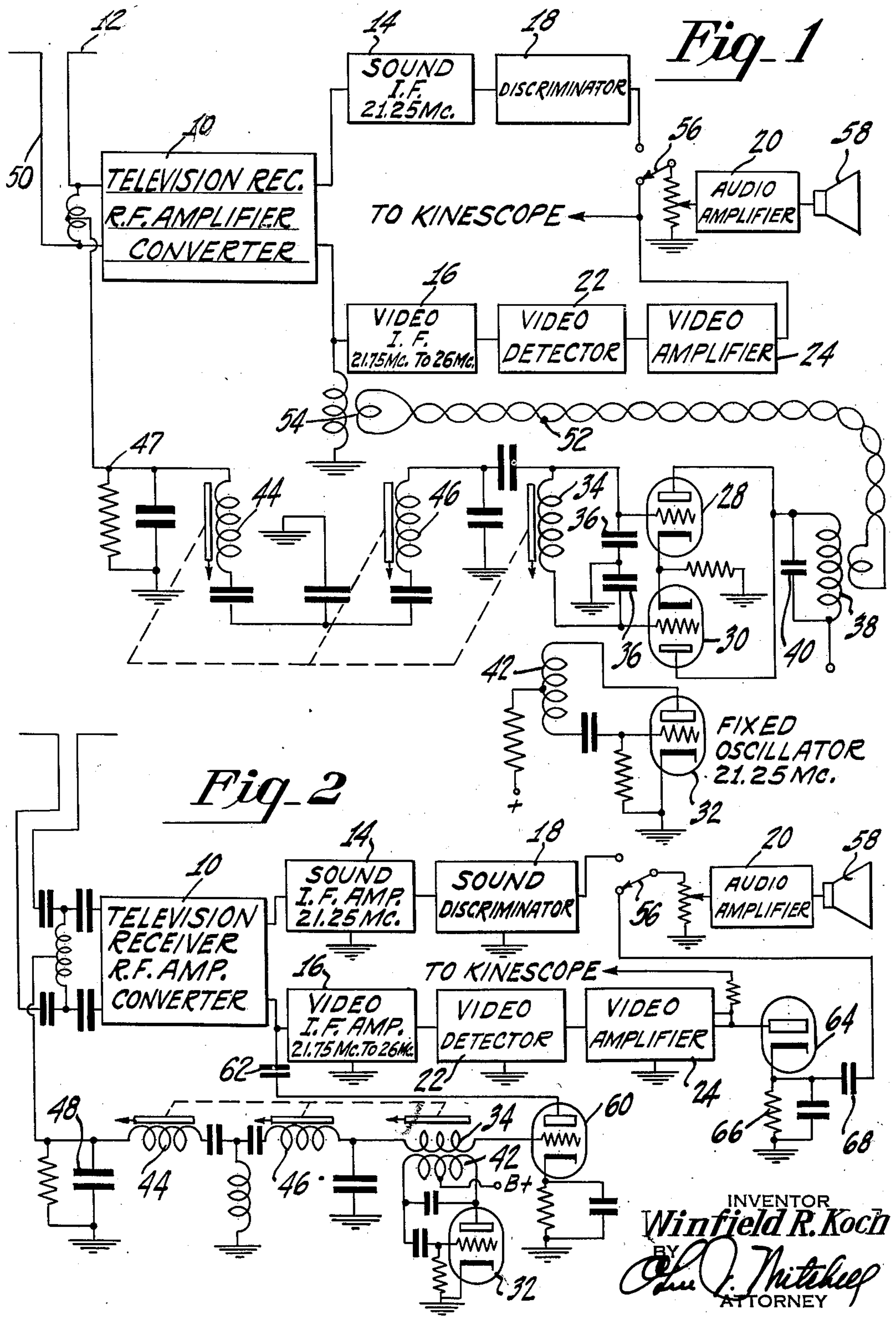

The present invention relates to improvements in radio receiving systems and more particularly, although not necessarily exclusively, to combination type radio receiving equipments adapted to receive a plurality of different type signal communications transmitted on respectively different radio carriers of different carrier frequencies bearing different modes of modulation.

In more particularity, the present invention deals with an improved form of combination type receiving system finding ready application to receiving circuits such to enable reception of standard broadcast AM signals through the agency of standard television receiving circuits.

Present-day trends in the design of home instruments for the reception and reproduction of the various commercial radio broadcasting signals such as television FM broadcast, AM broadcast, etc. seem to emphasize the desirability of combining circuit functions so as to more economically provide, in a single instrument, facilities for receiving a plurality of the various radio entertainment channels.

In the case of present-day television receivers which incorporate separate receiving channels for television AM and FM television sound intelligence, there is afforded a good opportunity for re-circuiting some of the electron elements to aid in the reception of other forms of communication. For instance, by extending the range of the radio frequency tuner section of the television receiver, it is quite possible to economically provide a very satisfactory FM broadcast receiver if the band width of the television sound channel and its associated FM discriminator is made sufficiently wide. However, up to the present time, little use has been made of the television receiver components for the reception of standard broadcast AM signals falling within the range of 540 to 1600 kc.

It is therefore a purpose of the present invention to provide a simple and economical combination type television receiving circuit which not only provides reception and reproduction of television signals but also at the expense of little additional circuitry provides high quality reception of standard broadcast AM signals.

It is further a purpose of the present invention to provide a simple and economical adapting circuit for existing television receivers which will permit the receiver to be used in the reception of standard broadcast AM signals.

The present invention is further involved with the provision of a novel system of circuitry which permits the common elements of present-day television receivers to be efficiently utilized in the reception of standard broadcast AM signals.

In order to accomplish the above objects, the present invention contemplates the use of a heterodyning circuit employing a fixed oscillator, having a frequency which, when added to the lowest frequency desired to be reproduced in a broadcast band, will fall within the band pass characteristic of a standard television receiver video I. F. amplifier. Rectifying means are then associated with the output of the television receiver video amplifier allowing the received AM standard broadcast signal to be demodulated and subsequently applied to the input of the sound amplifier otherwise utilized for the amplification of FM sound derived from the television receiver sound channel.

A fuller understanding of the operation of the present invention, as well as other objects and features of advantage in addition to these set forth hereinabove may be readily gleaned from the following specification especially when taken in connection with the accompanying drawing in which:

Figure 1 illustrates one embodiment of the present invention as applied to standard television receiver; and Figure 2 illustrates another embodiment of the present invention as applied to standard television receivers.

Referring now to Figure 1, there is represented by the block 10 some of the components of a typical modern-day television receiver including an R. F. amplifier and a converter. As is commonly the practice, signals intercepted by the antenna 12 are heterodyned by the television receiver converter to produce a sound I. F. signal for application to the sound I. F. amplifier represented by block 14 and a video I. F. signal for application to the video I. F. amplifier indicated by block 16. Accordingly, the output of the sound I. F. amplifier is applied to an FM discriminator indicated at block 18, whose output is generally coupled with the input of an audio amplifier 20 for reproduction of the sound accompanying the television transmission. The output of the video I. F. amplifier 16 is applied to a video detector 22 to obtain a video signal which is then applied to the input of the video amplifier 24. The output of the video amplifier 24 is conventionally applied to the input of an image reproducing device, such as a kinescope. For ease in illustration, the kinescope itself has not been shown nor have the beam deflection circuits for the kinescope been indicated.

Purely by way of example, the sound I. F. amplifier is illustrated as being designed around an intermediate frequency of 21.25 mc. while the video I. F. amplifier is illustrated as being designed for an intermediate frequency of 21.75 mc. It is to be understood that these numerical values are purely exemplary and may in practice be found to assume various other values as the particular design of the receiving equipment dictates. Typical examples of the well-known circuit configurations in each of the circuit blocks shown may be obtained in an article entitled "Television receivers" by Antony Wright appearing in the RCA Review for March 1947. Other examples of typical circuit arrangements represented by the block diagrams may be found in an article entitled "Video receiver circuits simplified" by D. D. Cole in the magazine Tele-Tech for January 1949, as well as in an article entitled "Television receiving systems" by C. M. Sinnett appearing in the monthly publication Electrical Engineering for June 1949. The receiving frequency range for most commercial television receiving circuits is made to give reception on channels 2 through 13 covering the frequency range of 54 mc. to 216 mc.

According to the embodiment of the present invention shown in Figure 1, there are provided three discharge tubes 28, 30, and 32 connected in a well-known form of balanced modulator type of heterodyning circuit. The discharge tubes 28 and 30 are respectively connected in a balanced modulator fashion having an input circuit defined by the inductance 34 and capacitor 36 and an output circuit defined by the inductance 38 and the capacitor 40. The oscillator 32 is, by means of its resonant tank circuit 42, made to sustain oscillations at a frequency fairly close to the I. F. frequency of the video I. F. channel 16. In the particular arrangement shown in Figure 1, the oscillator is indicated as being tuned to a frequency of 21.25 mc. which is the standard intermediate frequency for the sound amplifier 14 and which, as reference to the above cited publications will show, is the frequency at which the video I. F. amplifier 16 is generally given a rejection characteristic. This rejection characteristic is employed to reduce the possibility of sound interference in the television picture. In general, however, the oscillator 32 may be given any frequency which when added to the lowest broadcast frequency it is desired to receive will yield a signal frequency falling within the pass range of the video amplifier 16.

Accordingly, the heterodyne circuit is connected with the output of any type of selective tuning system covering the broadcast frequency range such as, for example, indicated by the selectively tunable circuits 44 and 46 and the heterodyne input circuit 34. These selective elements 44, 46 and 34 of the tuning system are ganged together in such a way as to provide tracking over the entire broadcast band. The input of the selective system may, if desired, be connected with any form of antenna suitable for picking up radio carrier frequencies in the AM broadcast range. As illustrated in Figure 1, the input terminal 47 of the tuning system is coupled with the transmission line 50 of the television antenna. In this way, the transmission line itself acts as an AM broadcast frequency antenna.

In further accordance with the present invention, heterodyne circuit output signal developed across the inductance 38 is coupled by some means such as the twisted pair 52 to the input of the video I. F. amplifier at 16. In Figure 1, the coupling to the video amplifier is accomplished by the coupling transformer 54. However, it will be understood that any convenient mode of coupling may be utilized.

In the normal operation of the television receiver of Figure 1 the audio amplifier 20 is, by means of the switch shown at 56, connected with the output of the discriminator 18 while the oscillator 32 and the balanced heterodyne modulator circuit 28 and 30 may be disabled.

However, when operating the circuit in accordance with the present invention, the switch 56 connected with the audio amplifier 20 is connected with the output of the video amplifier 24 and the heterodyne circuit comprising tubes 28, 30 and 32 is activated. Under such conditions AM broadcast signals will be heterodyned by the heterodyning circuit up to frequencies falling within the video I. F. band of the amplifier 16. This will be evident since the AM broadcast band is only about one mc. wide while the video I. F. amplifier for television receiver is, as pointed out hereinabove, generally in the range of 3 to 4 mc. wide. The thus heterodyned broadcast signals will then be detected by the video detector 22, whose output in turn will contain audio frequency components corresponding to the sound modulation envelope of the AM broadcast radio carriers. These audio frequency signals will then be amplified by the video amplifier 24 and applied to the input of the audio amplifier 20 for sound reproduction by the loudspeaker 58.

Among the many unique features of the present system, it will be apparent that the use of a fixed frequency heterodyning oscillator eliminates the annoysome tracking problem usually present in conventional AM broadcast receivers. Furthermore, because only a single signal is present in the amplifier at any given time very little cross-modulation will occur. Moreover, the image interference will be greatly reduced because of the high intermediae frequency to which the broadcast band carriers have been heterodyned or converted.

An alternative embodiment of the present invention is shown in Figure 2. The general arrangement of the television receiving system is substantially the same as that shown in Figure 1 and corresponding elements have been assigned like numerical designations. Here again, the oscillator 32 is tuned to some frequency which, when added to the lowest AM broadcast frequency desired to be reproduced, will fall in the video I. F. pass band of the amplifier 16. However, in Figure 2, the balanced modulator circuit comprising tubes 28 and 30 of Figure 1 has been replaced by a single discharge tube 60 which has its input circuit coupled with both the output of the selective tuning system and the oscillator 32. Also, in Figure 2, the output of the heterodyne circuit is shown to be capacitively coupled to the input of the video I. F. amplifier 16 via capacitor 62. It will be further seen that since a single ended type of heterodyne mixer has been employed, there will be no cancellation of the oscillator frequency generated by the oscillator 32. Thus, there will be a rather high amplitude oscillator component present in the video I. F. amplifier itself.

With the arrangement of Figure 2, the operation of the present invention may be regarded as slightly different from that of Figure 1. Since there is present in the video I. F. amplifier 16 both the oscillator frequency and the intermediate frequency to which the AM broadcast carriers have been heterodyned, there will necessarily appear at the output of the video detector 22 the original broadcast carrier frequency being received which will fall within the range of 540–1600 kc. The video amplifier 24, generally having a frequency response from 40 cycles to 4 mc., will then amplify this modulated carrier appearing at the output of the video detector. The output of the video amplifier may then be conventionally detected by means of a rectifying circuit such as 64. The audio voltage corresponding to the envelope of the received broadcast signals will then appear across the load resistance 66 which, in turn, may be capacitively coupled by capacitor 68 and on through the switch 56 to the input of the audio amplifier 20. The rectifier 64 may be a separate rectifier or detector circuit set aside for this purpose alone or, as indicated in Figure 2, it may be nothing more than the television D. C. re-inserter diode for the video amplifier or kinescope. It is further apparent that in television sets employing a diode type of sync separator circuit that the sync separator itself could be employed as a demodulator circuit in accordance with the present invention.

The R. F. selective tuner comprising circuits 44, 46 and 34 may be made to assume a variety of forms without extending beyond the scope of the present invention. This R. F. tuner circuit may be designed to embrace more tuned circuits than just the three shown so that somewhat greater selectivity is obtained. Moreover, the design of the selective tuning system may be made somewhat more complicated to yield a more constant band width than the simple arrangement shown.

Having thus described my invention, what I claim is:

1. In a combination superheterodyne television and AM broadcast receiver having at least a superheterodyne converter stage for producing video I. F. signal at frequency $f_1$, means for demodulating frequency modulated sound intelligence corresponding to the video signal information, a sound amplifier for said demodulated sound, a video I. F. amplifier for said video I. F. signal said amplifier having an attenuating characteristic at some frequency $f_2$, a video detector for said video I. F. signal and a video amplifier for the output of said video detector, the electrical circuit arrangement comprising, a non-linear mixing circuit having at least two inputs and one output, a fixed oscillator developing a frequency substantially equal to $f_2$, an adjustable tuning network for selecting and transmitting AM carrier frequencies within the broadcast band, means for coupling outputs of both said oscillator and said tuning network to the respective inputs of said mixing circuit, means for coupling the output of said mixing circuit to the input of said video I. F. amplifier and means for selectively communicating the output of said video amplifier to the input of said sound amplifier.

2. Apparatus according to claim 1 wherein said mixing circuit comprises a balanced modulator circuit wherein the output of said oscillator is applied as the modulator circuit carrier and the output of said converter is applied as the modulated circuit signal information.

3. Apparatus according to claim 1 wherein the magnitude of said oscillator signal applied to the input of said video I. F. amplifier is made sufficiently large to produce a substantial video I. F. amplifier output at the oscillator frequency and wherein said selective communicating means comprises a diode demodulator circuit having its input connected with the output of said video amplifier and its output connected with means for selectively applying said output to said sound amplifier input.

4. In a television receiving apparatus comprising a superheterodyne converter for producing amplitude modulated video intermediate frequency signals, a restricted bandpass amplifier for said video intermediate frequency signal, and a sound amplifier designated for normally communicating sound intelligence detected from frequency modulated signals accompanying a received video radio carrier, an amplitude modulation receiving arrangement for standard broadcast band frequencies comprising in combination a fixed frequency oscillator having a frequency which when increased by the lowest amplitude modulation broadcast carrier frequency will fall within the bandpass of said video intermediate frequency amplifier, a tunable selecting circuit for broadcast frequencies, a heterodyning circuit having its input connected with the outputs of said oscillator and said selecting circuit, means for rectifying the output of said video intermediate frequency amplifier and means for selectively applying said rectified output to said sound amplifier for reception of amplitude modulated broadcast intelligence.

5. Apparatus according to claim 4 wherein said heterodyning circuit is of the balanced modulator variety so connected to minimize the amplitude of output signal at the oscillator frequency whereby the output of said rectifying means is comprised mainly of signal variations representing the modulation envelope of the selected broadcast carrier.

6. Apparatus according to claim 4 wherein the oscillator frequency itself falls within the bandpass of said video intermediate frequency amplifier and wherein said heterodyning circuit is adapted to produce in its output a considerable magnitude of oscillator frequency whereby the output of said rectifying means is comprised mainly of signal variations corresponding to the carrier frequency of the selected broadcast carrier.

7. Apparatus according to claim 6 wherein said television receiving circuit includes a D. C. picture information restorer arrangement connected with the output of an amplifier designated and connected to communicate signals appearing at the output of said rectifying means and connections from the output of said D. C. restorer to the input of said sound amplifier.

WINFIELD R. KOCH.

REFERENCES CITED

The following references are of record in the file of this patent:

UNITED STATES PATENTS

| Number | Name | Date |
|---|---|---|
| 2,075,962 | Roberts | Apr. 6, 1937 |
| 2,270,652 | Espley | Jan. 20, 1942 |
| 2,491,808 | Fyler | Dec. 20, 1949 |

FOREIGN PATENTS

| Number | Country | Date |
|---|---|---|
| 450,263 | Great Britain | July 14, 1936 |